United States Patent
Uchida et al.

(10) Patent No.: US 9,686,492 B2
(45) Date of Patent: Jun. 20, 2017

(54) IMAGE SENSOR, IMAGE CAPTURING APPARATUS AND CELLULAR PHONE HAVING DUAL REFERENCE SIGNAL GENERATORS ARRANGED IN SEPARATED CHIPS

(71) Applicant: CANON KABUSHIKI KAISHA, Tokyo (JP)

(72) Inventors: Mineo Uchida, Kawasaki (JP); Shohei Tozawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 363 days.

(21) Appl. No.: 14/560,893

(22) Filed: Dec. 4, 2014

(65) Prior Publication Data

US 2015/0163433 A1    Jun. 11, 2015

(30) Foreign Application Priority Data

Dec. 6, 2013  (JP) .................................. 2013-253613
Nov. 12, 2014  (JP) .................................. 2014-230107

(51) Int. Cl.
    *H04N 5/378*    (2011.01)
(52) U.S. Cl.
    CPC .................................. *H04N 5/378* (2013.01)
(58) Field of Classification Search
    CPC .. H04N 5/378; H04N 5/37455; H04N 5/3355; H04N 5/3742
    USPC .................................. 250/208.1, 214 R, 239
    See application file for complete search history.

(56) References Cited

U.S. PATENT DOCUMENTS

| 2011/0037868 | A1  | 2/2011  | Ota |
| 2013/0286268 | A1  | 10/2013 | Hasegawa |
| 2015/0146063 | A1* | 5/2015  | Nishizawa ............. H04N 5/378 348/302 |

FOREIGN PATENT DOCUMENTS

| CN | 101523899 A | 9/2009 |
| CN | 101848344 A | 9/2010 |
| CN | 103369259 A | 10/2013 |
| CN | 103369268 A | 10/2013 |
| JP | 2005-333316 A | 12/2005 |

(Continued)

OTHER PUBLICATIONS

The above references were cited in a Sep. 22, 2016 Korean Office Action, which is enclosed without an English Translation, that issued in Korean Patent Application No. 10-2014-0173625.

*Primary Examiner* — Que T Le
(74) *Attorney, Agent, or Firm* — Cowan, Liebowitz & Latman, P.C.

(57) ABSTRACT

An image sensor comprises: a plurality of pixels; a first reference signal generator configured to output a first reference signal whose signal level changes with time; a second reference signal generator configured to output a second reference signal whose signal level changes with time, a rate of change of the signal level of the second reference signal being larger than that of the first reference signal; an analog-to-digital converter configured to perform an analog-digital conversion of a pixel signal output from each of the plurality of pixels using the first reference signal or the second reference signal selected in accordance with a magnitude of the pixel signal, wherein the plurality of pixels and the first reference signal generator are arranged in a first chip, and the second reference signal generator is arranged in a second chip.

14 Claims, 9 Drawing Sheets

(56) References Cited

FOREIGN PATENT DOCUMENTS

KR 10-2009-0058011 A 6/2009
KR 10-2012-0111730 10/2012

* cited by examiner

IMAGE SENSOR, IMAGE CAPTURING APPARATUS AND CELLULAR PHONE HAVING DUAL REFERENCE SIGNAL GENERATORS ARRANGED IN SEPARATED CHIPS

BACKGROUND OF THE INVENTION

Field of the Invention

The present invention relates to an image sensor, and an image capturing apparatus and a cellular phone using the image sensor.

Description of the Related Art

Conventionally, in a CMOS image sensor which is one type of solid-state image sensing elements, fusion of a CMOS logic process and image sensor process makes it possible to lay out a complicated analog circuit, digital circuit, signal processing unit, and so on, in a sensor chip. As an example, a CMOS image sensor formed with an analog digital (AD) converter laid out in an image sensor chip where pixels are two-dimensionally arranged has been already put to practical use.

In a case of forming an AD converter in an image sensor, such as a CMOS image sensor (referred to as a "CMOS sensor" hereinafter), a so-called column AD structure has been adapted. In the column AD structure, an AD converter is provided for each column of a pixel array arranged in matrix, and it is possible to reduce a conversion rate of each AD converter from a readout rate of one pixel to a readout rate of one row. Accordingly, not only overall power consumption can be reduced as the conversion rate of the AD converter decreases, but also the readout rate of the CMOS sensor can be easily increased as a consequence.

As an example of a CMOS sensor using a column AD structure, a CMOS sensor using a ramp type AD converter which uses a triangle wave has been put to practical use. In the ramp type AD converter, an analog value is input to one of the input terminals, and a reference output value that increases along with an operation of a counter is applied to the other input terminal. The AD conversion is implemented by taking a counter value at the time when the reference output value coincides with the analog value.

As the triangle wave changes the voltage in synchronization with the counter, in a case of an 8 bit AD converter, maximum of $2^8$ steps, namely, 256 steps of processes are needed in AD conversion. In a CMOS sensor using such ramp type AD converter, if the analog signal applied to the input terminal is large, the number of steps becomes large, and AD conversion processing speed decreases. If the speed up of the AD conversion processing is attempted, then a bit accuracy of the AD conversion decreases in a case where an analog signal applied to the input terminal is small.

In consideration of above, Japanese Patent Laid-Open No. 2005-333316 suggests to switch between the configurations of an AD converter depending on whether an operation mode which gives priority to increasing the number of bits is set or an operation mode which gives priority to increasing processing speed is set, thereby realizing both an increase in the number of bits and an increase in the processing speed in AD conversion.

However, in the technique disclosed in the Japanese Patent Laid-Open NO. 2005-333316, it is not possible to increase the number of bits and the processing speed in the AD converter simultaneously. Further, since the AD converter to be used is changed in accordance with the operation mode, the accuracy of the AD conversion may fluctuate depending on the levels of pixel signals.

SUMMARY OF THE INVENTION

The present invention has been made in consideration of the above situation, and makes it possible to obtain a high quality image at high speed without oppressing an area where each circuit is arranged in an image sensor which has a column AD structure.

According to the present invention, provided is an image sensor comprising: a plurality of pixels; a first reference signal generator configured to output a first reference signal whose signal level changes with time; a second reference signal generator configured to output a second reference signal whose signal level changes with time, a rate of change of the signal level of the second reference signal being larger than that of the first reference signal; an analog-to-digital converter configured to perform an analog-digital conversion of a pixel signal output from each of the plurality of pixels using the first reference signal or the second reference signal selected in accordance with a magnitude of the pixel signal, wherein the plurality of pixels and the first reference signal generator are arranged in a first chip, and the second reference signal generator is arranged in a second chip.

Further, according to the present invention, provided is an image capturing apparatus comprising an image sensor defined as above.

Furthermore, according to the present invention, provided is a cellular phone comprising an image sensor defined as above.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
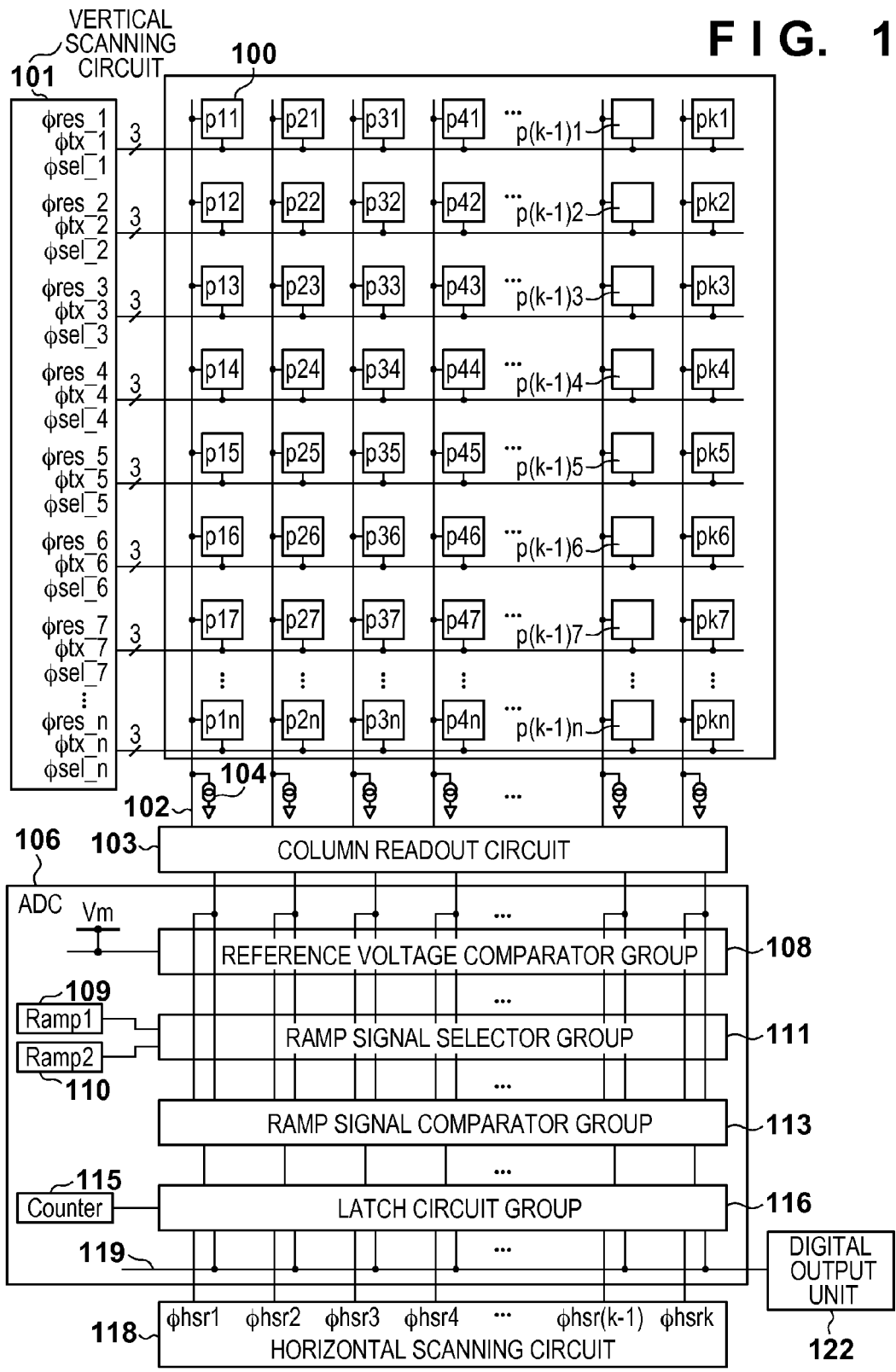
FIG. 1 is a diagram illustrating an overall configuration of an image sensor according to a first embodiment of the present invention.

FIG. 1 is a diagram illustrating an overall view of an image sensor used in image capturing apparatuses, such as digital still cameras and digital video cameras, according to a first embodiment of the present invention. In a pixel region 100, a plurality of pixels p are arranged in matrix. In FIG. 1, pixels are denoted by p11 to pkn, the row number being indicated by 1 to n, and the column number being indicated by 1 to k.

Figure 2:
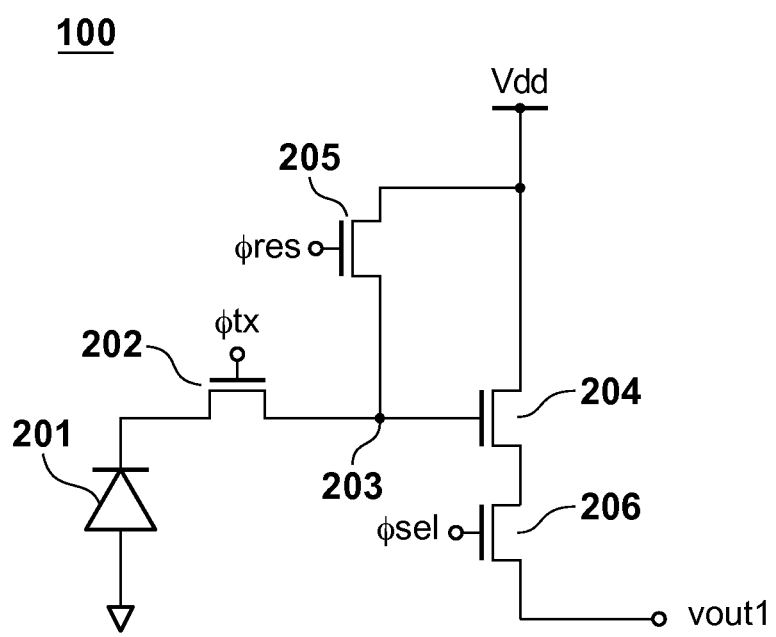
FIG. 2 is a circuit diagram of a pixel.

A configuration of a pixel p is explained with reference to FIG. 2. A photodiode (PD) 201 photoelectrically converts incident light to electrical charge, and accumulates the generated charge corresponding to a quantity of the incident light. The charge accumulated in the PD 201 is transferred to a floating diffusion (FD) portion 203 by turning on a transfer gate 202 by controlling a signal Øtx to a high level. The FD portion 203 is connected to a gate of an amplifier 204. The amplifier 204 converts the charge transferred from the PD 201 to a voltage corresponding to the amount of charge. Then, a signal Øsel for controlling a pixel selection switch 206 is turned to the high level, thereby a pixel signal converted to the voltage by the amplifier 204 is output as an output vout1 of the pixel p.

Further, by controlling a signal Øres to the high level, a reset switch 205 is turned on, thereby the FD portion 203 can be reset. Further, by controlling the signals Øtx and Øres to the high level simultaneously, the transfer gate 202 and the reset switch 205 are simultaneously turned on, and the PD 201 can be reset via the FD portion 203.

Referring to FIG. 1 again, a vertical scanning circuit 101 provides driving signals Øres, Øtx, Øsel, and so forth, to the reset switch 205, the transfer gate 202, the pixel selection switch 206 of each pixel via horizontal signal lines. In FIG. 1, pixels arranged in the same row are connected to the same horizontal signal lines, and signals output to the horizontal signal lines of each of the first to n-th rows are shown as signals Øres_1~n, Øtx_1~n, and Øsel_1~n.

An output vout1 from each pixel p is read out under the control of the vertical scanning circuit 101 in units of row, and output to a column readout circuit 103 provided for each column via a vertical output line (column output line) 102.

Figure 3:
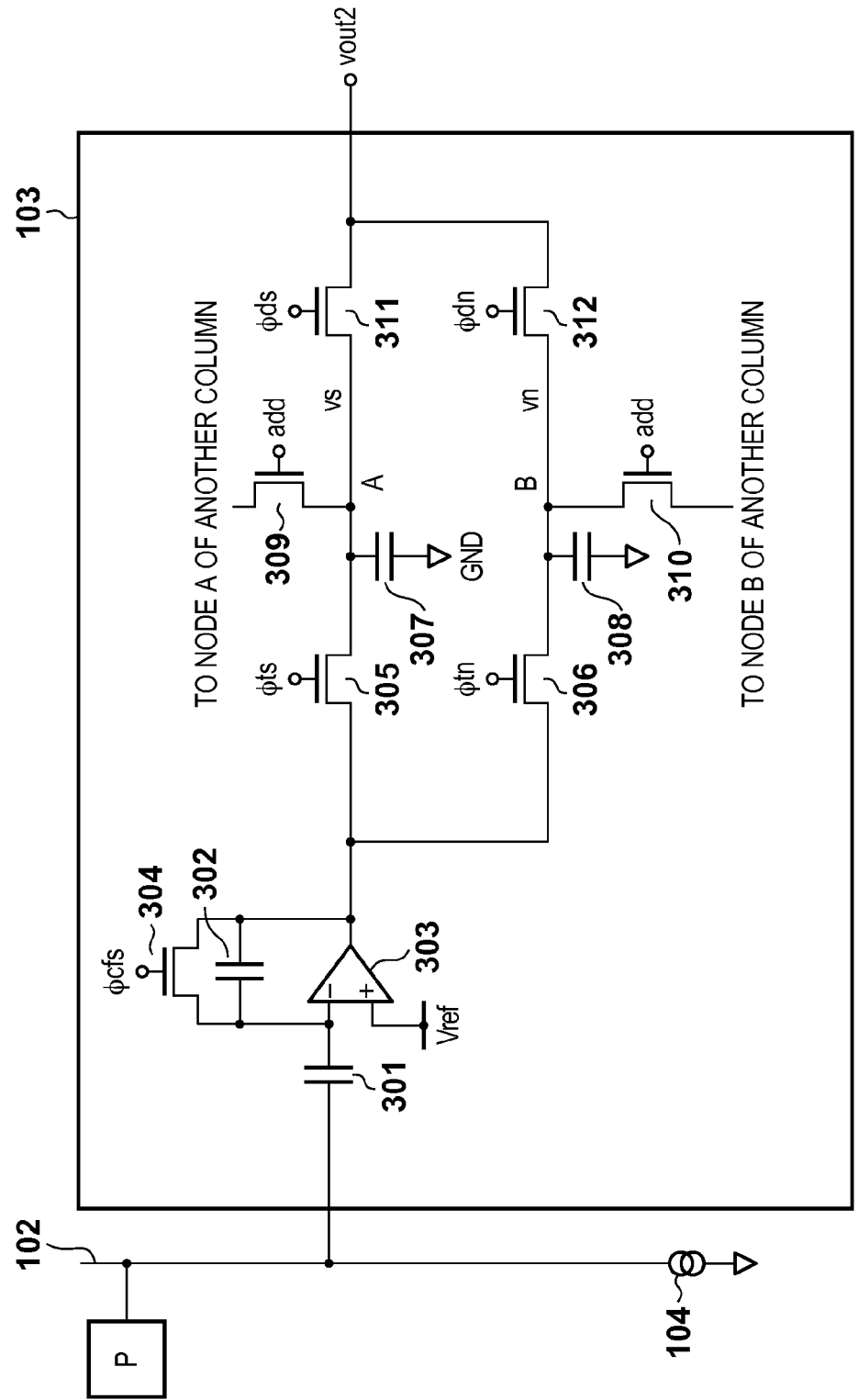
FIG. 3 is a circuit diagram of a readout circuit provided for each column of the image sensor.

Here, a configuration of the column readout circuit 103 is explained with reference to FIG. 3. The vertical output line 102 is arranged for each column, and an output vout1 from a pixel p connected to the vertical output line 102 is output. A current source 104 is connected to the vertical output line 102, and the current source 104 and the amplifier 204 of the pixel p connected to the vertical output line 102 constitute a source follower circuit.

A pixel signal output to the vertical output line 102 is input to an inverting input terminal of an operational amplifier 303 via a clamp capacitor 301. A reference voltage Vref is applied to a non-inverting input terminal of the operational amplifier 303. A switch 304 is used to short across a feed back capacitor 302, and controlled by the signal Øcfs.

An S signal transfer switch 305 is used for transferring a pixel signal S read out from the pixel p to an S signal capacitor 307. When a signal Øts is terned to the high level, the pixel signal S, which is amplified by the operational amplifier 303, is stored in the S signal capacitor 307 via the S signal transfer switch 305. The pixel signal S stored in the S signal capacitor 307 is output to an output terminal vout2 via an S signal output switch 311 by turning the signal Øds to the high level.

An N signal transfer switch 306 is used for transferring a noise signal N to an N signal capacitor 308. When a signal Øtn is turned to the high level, the noise signal N amplified by the operational amplifier 303 is stored in the N signal capacitor 308 via the N signal transfer switch 306. The noise signal N stored in the N signal capacitor 308 is output as the output terminal vout2 via an N signal output switch 312.

Namely, the pixel signal S or the noise signal N is output from the terminal vout2 in accordance with the ON/OFF of the S signal output switch 311 and the N signal output switch 312.

Referring to FIG. 1 again, an output from the terminal vout2 of the column readout circuit 103 is input to an analog-digital converter (ADC) 106 including a reference voltage comparator group 108, a ramp signal selector group 111, a ramp signal comparator group 113, and a latch circuit group 116.

A comparator is provided for each column in the reference voltage comparator group 108, and compares the signal from the terminal vout2 of each column and a reference voltage Vm. The comparator outputs a low-level signal if the signal from the terminal vout2 is smaller than the reference voltage Vm, and outputs a high-level signal if the signal from the terminal vout2 is equal to or higher than the reference voltage Vm. The comparison result of each comparator is output to the ramp signal selector group 111.

A selector is provided for each column in the signal selector group 111, and to each selector, a signal from the reference voltage comparator group 108, a signal from a first ramp signal generator 109, and a signal from a second ramp signal generator 110 are input. Each of the first ramp signal generator 109 and the second ramp signal generator 110 outputs a signal whose level changes with time. The slope of the waveform of the signal output from the first ramp signal generator 109 differs from that output from the second ramp signal generator 110. In the first embodiment, the second ramp signal generator 110 generates a signal whose waveform has a steeper slope than a signal generated by the first ramp signal generator 109. The ramp signal selector group 111 selects for each column one of the ramp signals output from the first ramp signal generator 109 and the second ramp signal generator 110 in accordance with an output from the reference voltage comparator group 108, and outputs the selected ramp signal to the ramp signal comparator group 113. In the first embodiment, each selector of the ramp signal selector group 111 outputs the ramp signal (first ramp signal) from the first ramp signal generator 109 in a case where a low-level signal is input from the reference voltage comparator group 108. On the contrary, each selector of the ramp signal selector group 111 outputs the ramp signal (second ramp signal) from the second ramp signal generator 110 in a case where a high-level signal is input from the reference voltage comparator group 108.

A comparator is provided for each column in the ramp signal comparator group 113, and to each comparator, an output signal from the terminal vout2 of the column readout circuit 103, and the first ramp signal or the second ramp signal are input. Each selector of the ramp signal comparator group 113 compares the output signal from the terminal vout2 of each column and the ramp signal from the ramp signal selector group 111, and outputs a signal to the latch circuit group 116 in accordance with a comparison result. More specifically, the signal level of the input ramp signal increases with time, and when the signal level exceeds the value of the signal from the terminal vout2 of each column, and each comparator changes a signal to be output to the latch circuit group 116 from the low level to the high level.

A latch circuit is provided for each column in the latch circuit group 116, and to each latch circuit, signals from the ramp signal comparator group 113, a counter 115, and a horizontal scanning circuit 118 are input. Each latch circuit of the latch circuit group 116 latches a counter value input from the counter 115 at the time when the level of the signal from the ramp signal comparator group 113 is changed from the low level to the high level. With the above operation, an analog signal read out from each pixel is converted to a digital value.

The latch circuit group 116 is also controlled by a control signal Øhsri (i is the column number, i=1~k) from the horizontal scanning circuit 118. The horizontal scanning circuit 118 controls the control signal Øhsri to the high level to transfer the counter value latched by each latch circuit of the latch circuit group 116 to a horizontal output line 119. The horizontal output line 119 is connected to a digital output unit 122, and an AD-converted pixel signal is output via the digital output unit 122. Upon outputting the digital value from each latch circuit, "0"s are appended to the higher-order bit or the lower-order bit depending upon which of the ramp signals each selector of the ramp signal selector group 111 has selected. For example, a case where the second ramp signal is four times steeper than the first ramp signal is considered. In this case, two "0"s are appended to the higher-order bit of a signal obtained in a case where the first ramp signal is selected and AD-converted, and two "0"s are appended to the lower-order bit of a signal obtained in a case where the second ramp signal is selected and AD-converted. In this way, it is possible to make the resolutions of AD conversion results using the two ramp signals even.

Figure 4A:
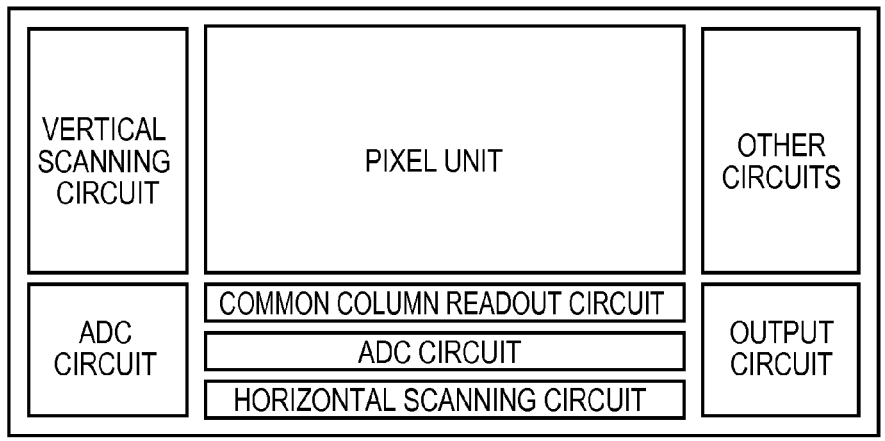
FIGS. 4A to 4C are diagrams illustrating a chip configuration of the image sensor according to the first embodiment.
Figure 4B:
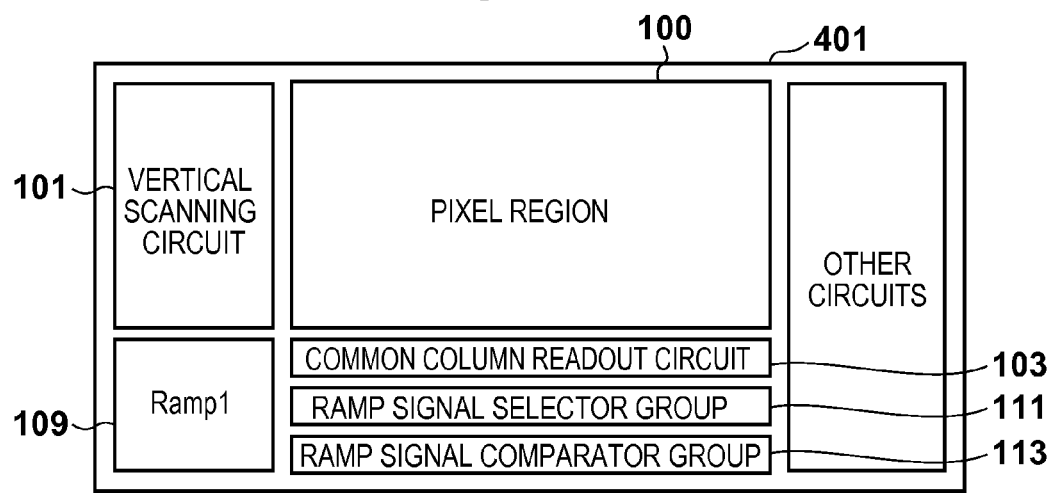
Figure 4C:
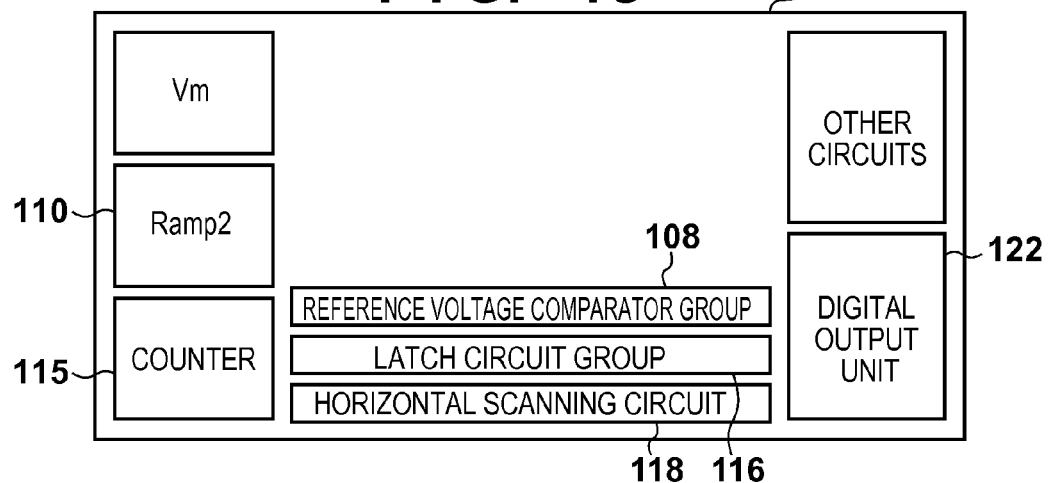

The circuit of the ADC 106 having the above configuration is arranged in two chips. The layout of the circuit of the ADC 106 in a first chip and second chip according to the first embodiment will be explained below with reference to FIGS. 4A to 4C and FIG. 5. In FIGS. 4A to 4C, a hatched portion indicates a circuit configuring the ADC circuit in each chip configuration.

FIG. 4A shows a conventional image sensing element having the one-chip structure. A pixel unit, a vertical scanning circuit, common column readout circuit, ACD circuit, horizontal scanning circuit, output circuit, and other circuits are formed in one chip.

By contrast, the image sensing element of the first embodiment has a two-chip structure in which the first chip and the second chip are stacked as shown in FIGS. 4B and 4C. FIG. 4B shows the first chip 401, and FIG. 4C shows the second chip 402. Formed in the first chip 401 are the pixel region 100, the vertical scanning circuit 101, the column readout circuit 103, the first ramp signal generator 109, the ramp signal selector group 111, the ramp signal comparator group 113, and other circuits including the power source 104. Formed in the second chip 402 are a power source or a terminal of the reference voltage Vm, the reference voltage comparator group 108, the second ramp signal generator 110, the counter 115, the latch circuit group 116, the horizontal scanning circuit 118, the digital output unit 122, and other circuits. As described above, by separately laying out the circuits necessary for forming the ADC 106 in the first chip and the second chip, it is possible to realize a high speed and multi-bit AD conversion, secure a large area for the constituents of each circuit, and secure a accuracy of analog properties.

Figure 5:
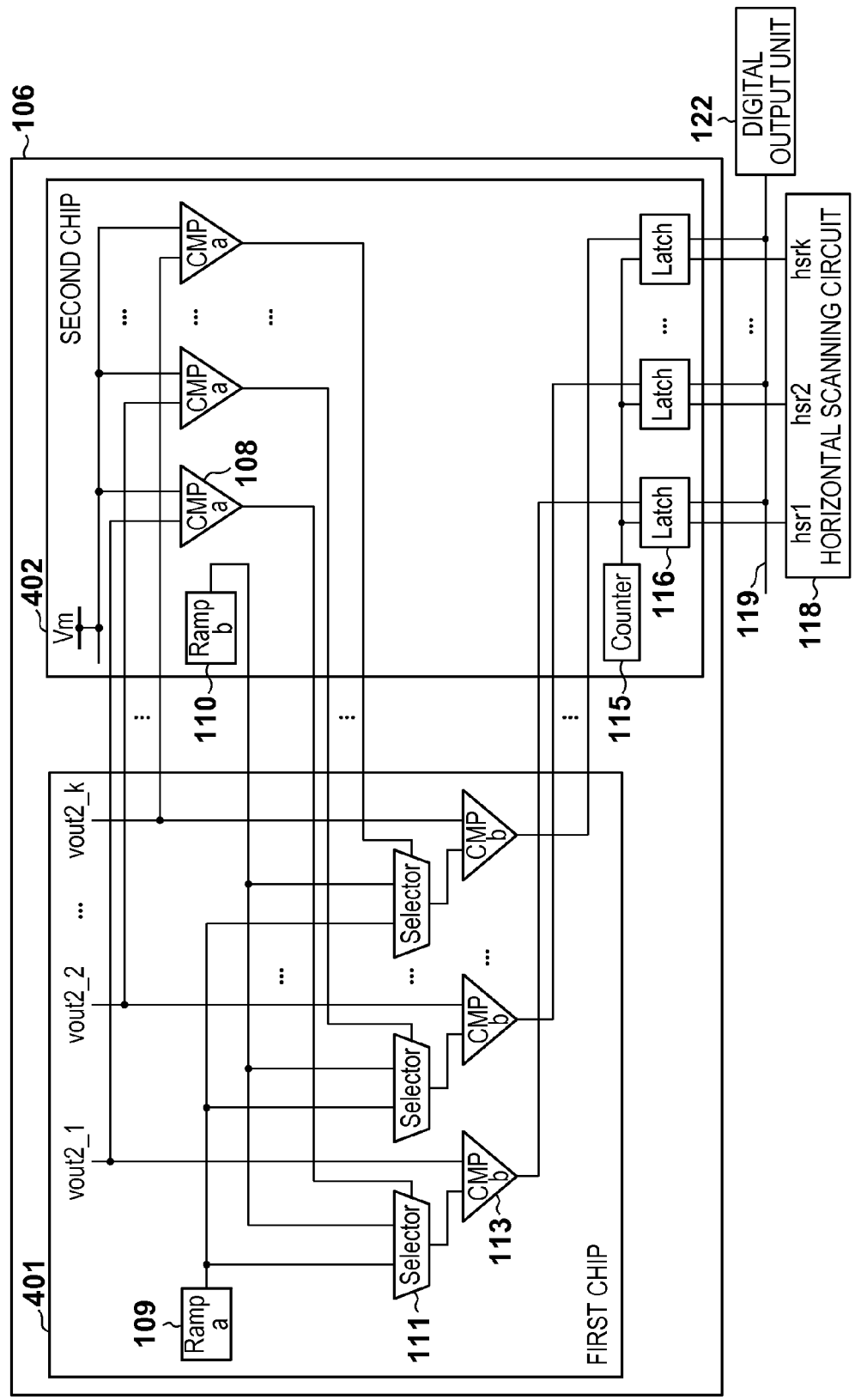
FIG. 5 is a circuit diagram of an AD converter of an image sensor according to the first embodiment.

FIG. 5 is a diagram illustrating a configuration of circuits formed in the first chip 401 and the second chip 402. From the first chip 401 to the second chip 402, a signal from the output terminal vout2_i (i is the column number, i=1~k) that is an S signal or N signal, and a signal from the ramp signal comparator group 113 (CMPb) are output. Further, from the second chip 402 to the first chip 401, a signal from the reference voltage comparator group 108 (CMPa) and the second ramp signal are output.

Generally, when signals are transmitted between chips, signal quality, such as a waveform, deteriorates due to the effect of impedance between the chips. Below, a reason for arranging circuits which form the ADC 106 according to the first embodiment as shown in FIGS. 4A to 4C and FIG. 5 will be explained. First, the reference voltage comparator group 108 merely determines whether the signal output from the terminal vout2 is larger or smaller than the reference voltage Vm, and the determination result does not directly affect accuracy of the AD conversion. Therefore, the effect of signal transmission to and from the reference voltage comparator group 108 between the chips on the image quality is small. Second, the slope of the waveform of the second ramp signal generated by the second ramp signal generator 110 is steeper than that of the first ramp signal generated by the first ramp signal generator 109, and therefore, the second ramp signal is selected when converting a signal with a high level. Further, since a signal with a high level is converted, an effect of deterioration of signal quality due to the transmission between the chips on the image quality is relatively small. With the above reasons, the reference voltage comparator group 108 and the second ramp signal generator 110 are arranged in the second chip 402.

Note, if an effect of the signal transmission between the chips is large, the signal transmitted or to be transmitted may be corrected on the receiving side or transmitting side. For example, in a case where a signal output from the ramp signal comparator group 113 is the high level in the first chip 401 and drops to a level that is difficult to be distinguished from the low level after being transmitted to the second chip 402, an amplifier that amplifies the amplitude of the output signal of the ramp signal comparator group 113 may be added.

By transmitting signals between the first chip 401 and the second chip 402 as described above, image signals are eventually output from the digital output unit 122.

According to the first embodiment as described above, it is possible to realize the ADC 106 with high processing speed and high bit accuracy while securing an area for the constituents of each circuit of an image sensor by distributing circuits of the ADC 106 in the first chip 401 and the second chip 402.

MODIFICATIONS

Figure 6:
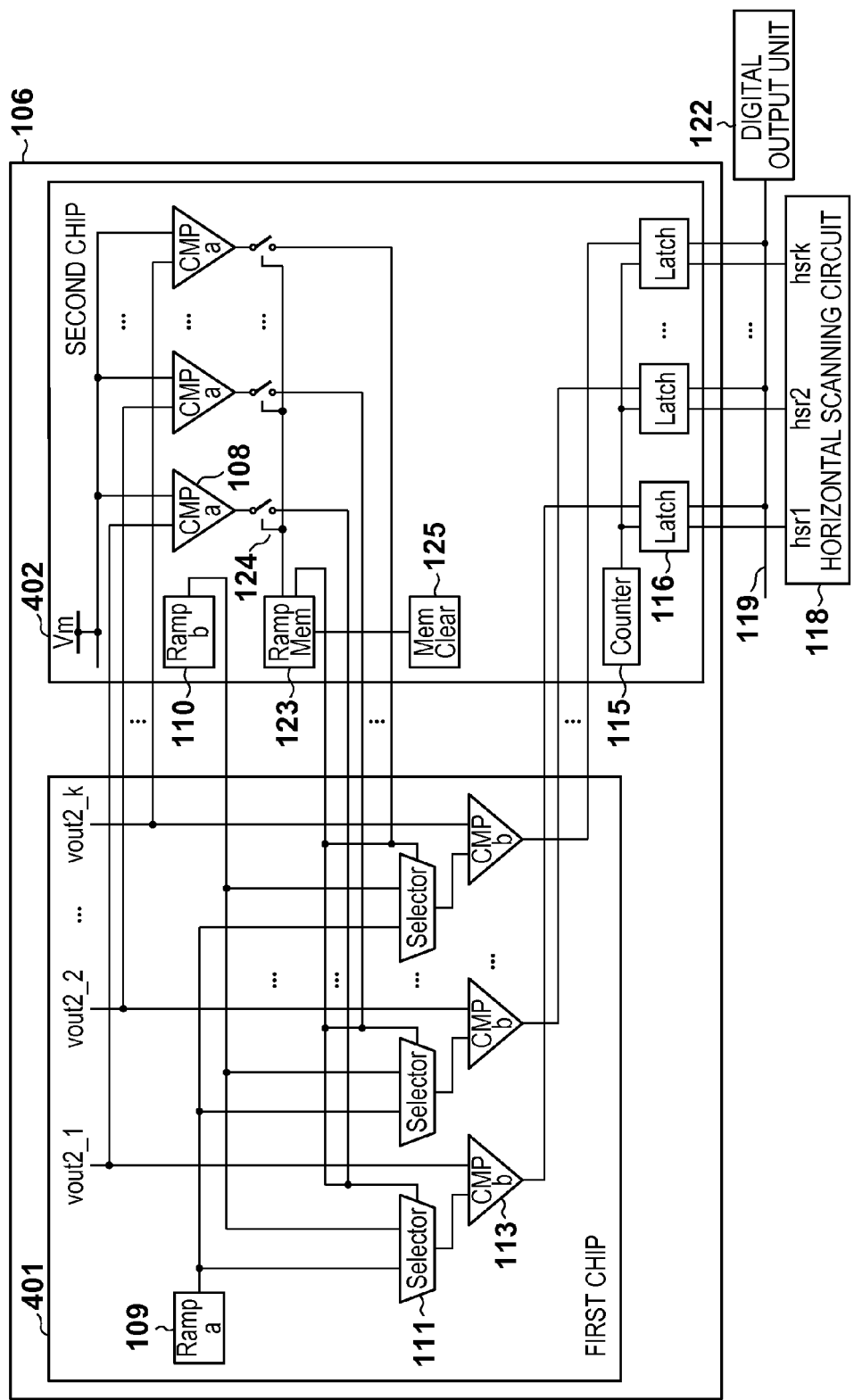
FIG. 6 is a circuit diagram of an AD converter of an image sensor according to a modification.

In the first embodiment as described above, either of the first ramp signal or the second ramp signal is selected depending on the level of the output signal vout2 of the column readout circuit 103, however, the present invention is not limited to this. For example, as shown in FIG. 6, a ramp signal memory 123 (Ramp Mem) may be provided. In this case, which ramp signal is used for the output signal read out from each pixel p in a given frame is stored for the frame, and the ramp signal generator corresponding to the ramp signal stored in the ramp signal memory 123 may be used in the subsequent frames.

With such structure, if nothing is stored in the ramp signal memory 123, the ramp signal generator to be used is selected by the ramp signal selector group 111 in accordance with the comparison result of the signal output from the terminal vout2 and the reference voltage Vm by controlling the switch 124. On the other hand, if information on the used ramp signals is stored in the ramp signal memory 123, it is controlled so as to select and use the ramp signal corresponding to the information stored in the ramp signal memory 123, by opening the switch 124. With this configuration, it becomes unnecessary to compare the signal output from the terminal vout2 with the reference voltage Vm in the second and subsequent frames, thereby increasing the processing speed.

Further an expiration date controller 125 (Mem Clear) may be used to control whether or not to delete information of the ramp signal generator stored in the ramp signal memory 123. In this case, the expiration date controller 125 deletes information of the ramp signal generator stored in the ramp signal memory 123 after a predetermined number of frames or a predetermined period of time has elapsed. Then, the information on the ramp signal to be used is appropriately updated by selecting a ramp signal to be used on the basis of the result of a comparison between the signal output from the terminal vout2 and the reference voltage Vm and storing the selected ramp signal in the ramp signal memory 123.

Figure 7:
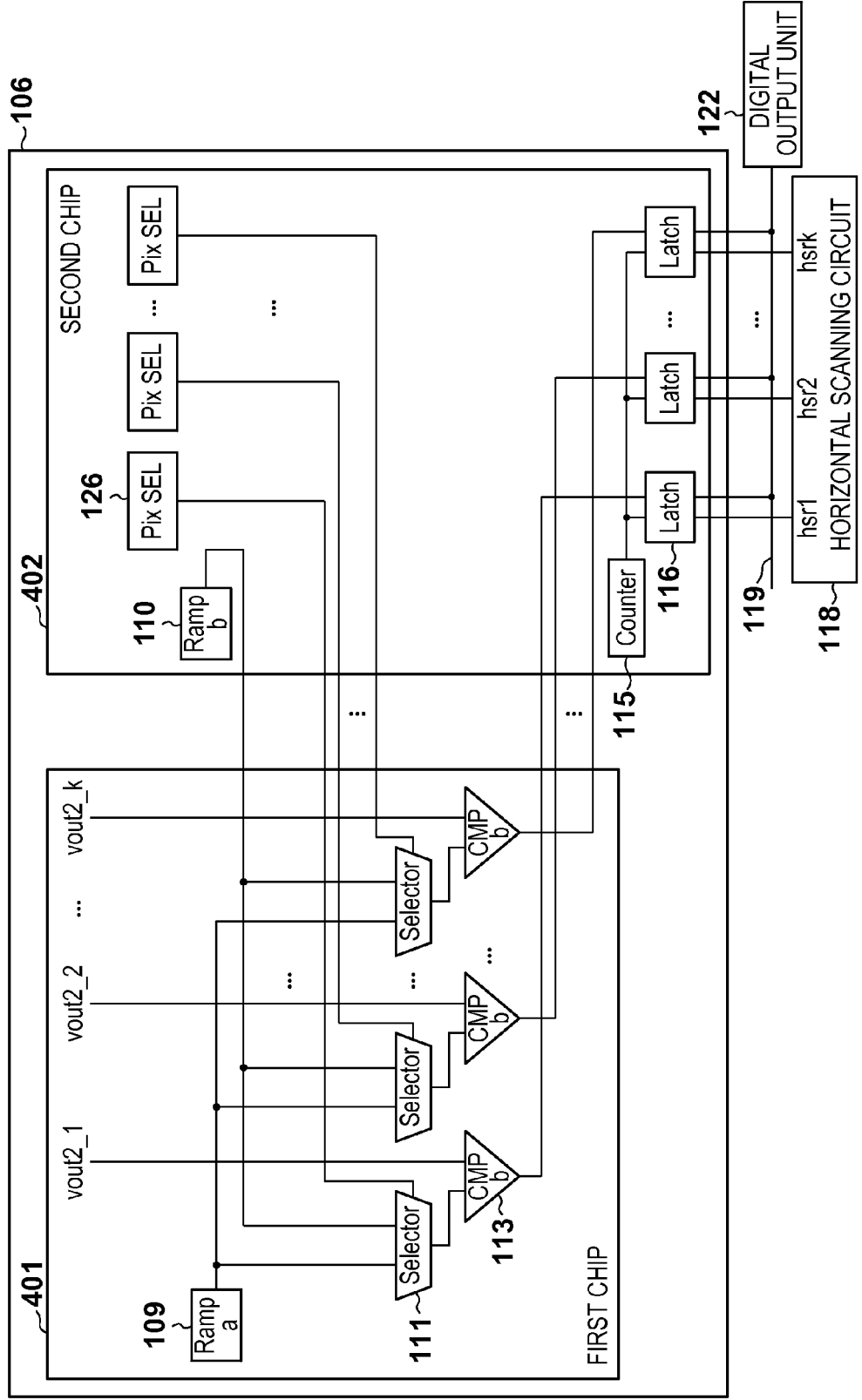
FIG. 7 is a circuit diagram of an AD converter of an image sensor according to a modification.

Further, as shown in FIG. 7, the ADC 106 may be configured such that a ramp signal generator to be used may be changed for each color of a pixel by a pixel color selector 126 (Pixel SEL). With this configuration, for the signal output from the terminal vout2 obtained by reading an R pixel or B pixel, the pixel color selector 126 uses a ramp signal output from the first ramp signal generator 109 by inputting the low-level signal to the ramp signal selector group 111. On the contrary, for the signal from the output terminal vout2 obtained by reading a G pixel, the pixel color selector 126 uses a ramp signal output from the second ramp signal generator 110 by inputting the high-level signal to the ramp signal selector group 111. By configuring the ADC converter 106 as described above, a mechanism for comparing a signal from each pixel to the reference voltage Vm becomes unnecessary, and the circuit scale can be reduced.

Figure 8:
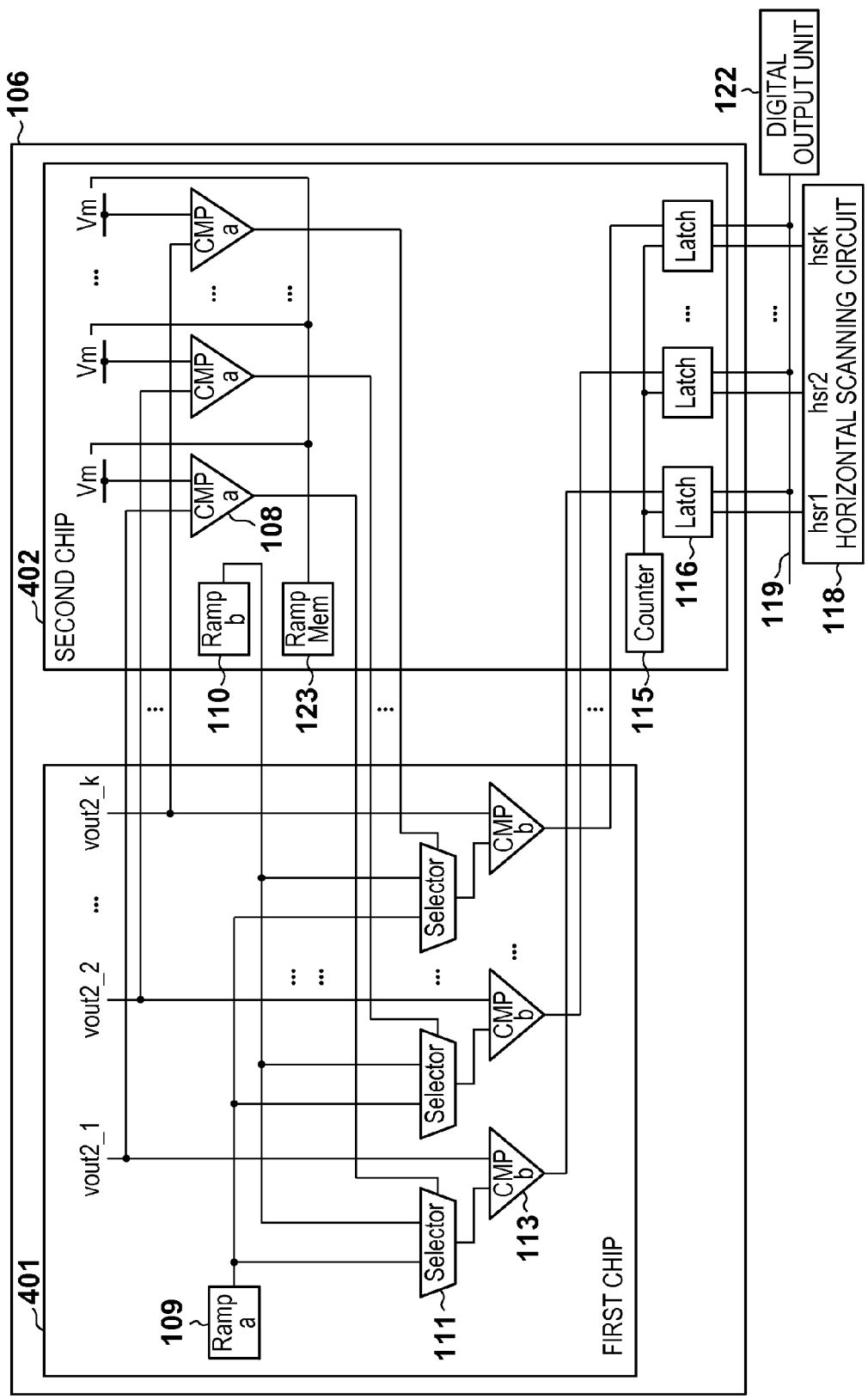
FIG. 8 is a circuit diagram of an AD converter of an image sensor according to a modification.

Furthermore, the common reference voltage is used in the respective columns in the first embodiment as described above, however, the present invention is not limited to this. As shown in FIG. 8, the ADC 106 may be configured such that a reference voltage Vm whose magnitude can be changed is independently prepared for each column, and the ramp signal memory 123 is supplied with each reference voltage Vm. With this configuration, in a case where nothing is stored in the ramp signal memory 123, a ramp signal generator to be used is selected by the ramp signal selector group 111 in accordance with the comparison result of the signal output from the terminal vout2 and the reference voltage Vm having a given initial value. Then, the used ramp signal generator is recorded in the ramp signal memory 123. In a case where information on the used ramp signal generator is stored in the ramp signal memory 123, the reference voltage Vm is changed in accordance with the information.

For example, in a case where information indicating that the first ramp signal was used is stored in the ramp signal memory 123, the reference voltage Vm is used by setting it to an output value larger than a given initial value. By contrast, in a case where information indicating that the second ramp signal was used is stored in the ramp signal memory 123, the reference voltage Vm is used by setting it to an output value smaller than a given value. By designing the ADC 106 to have such hysteresis, the ramp signal generator to be used does not change frequently even in a case where signals that fluctuates around the reference voltage Vm are successively output from the terminal vout2. Accordingly, it is possible to restrain the variation of AD conversion due to difference in electrical characteristics between the ramp signal generator 109 and the ramp signal generator 110.

Second Embodiment

Figure 9:
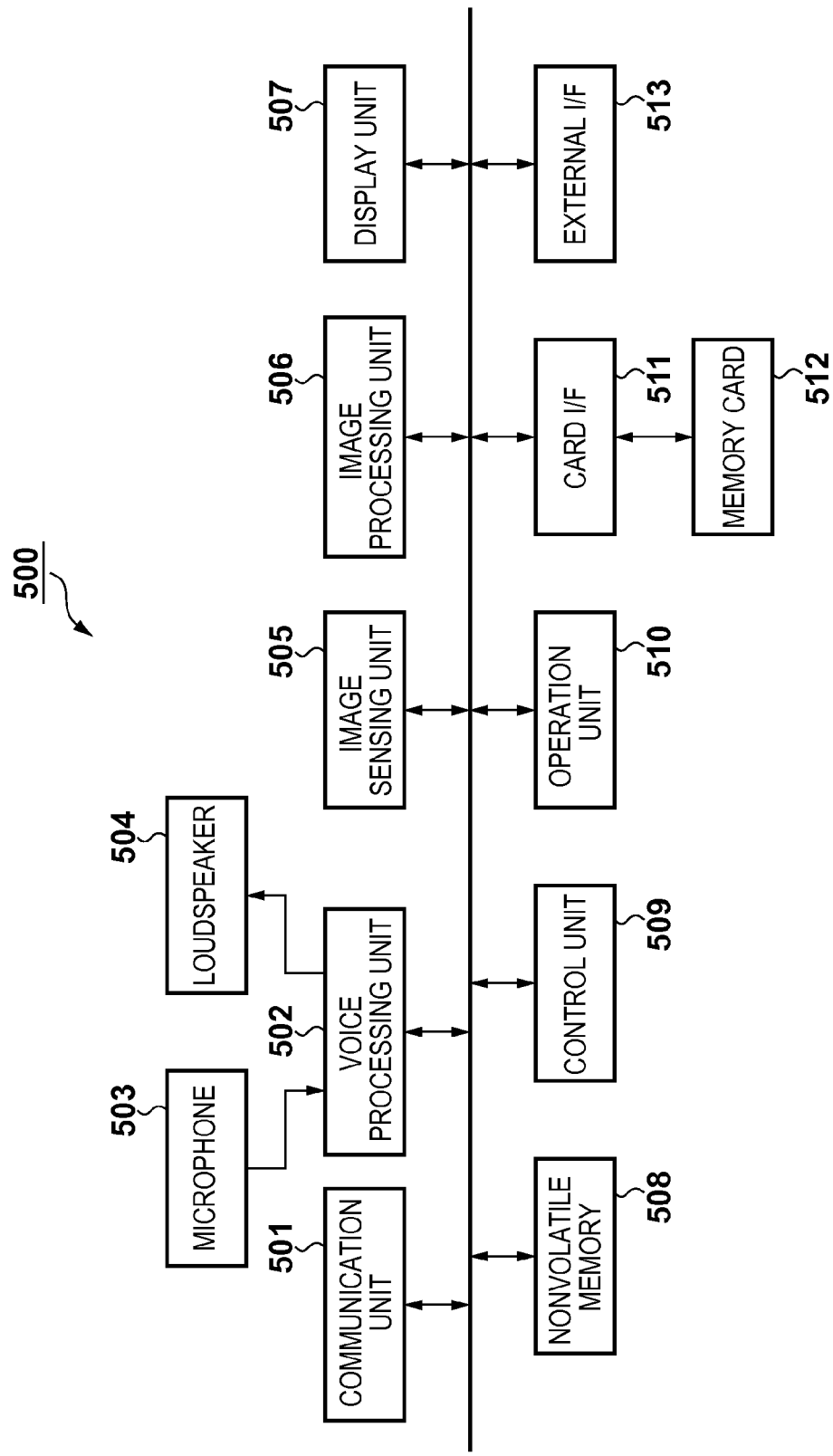
FIG. 9 a block diagram showing a schematic arrangement of a cellular phone according to a second embodiment.

FIG. 9 is a block diagram showing an arrangement of a cellular phone 500 according to the second embodiment of the present invention. The cellular phone 500 according to the second embodiment has the e-mail function, Internet connection function, image shooting/playback function, and the like, in addition to the voice communication function.

In FIG. 9, a communication unit 501 communicates voice data and image data with another phone by a communication method complying with a communication carrier with which the user has a contract. In voice communication, a voice processing unit 502 converts voice data from a microphone 503 into a format suited for origination, and sends the converted data to the communication unit 501. Also, the voice processing unit 502 decodes voice data from a call destination that has been sent from the communication unit 501, and sends the decoded data to a loudspeaker 504.

An image sensing unit 505 includes the image sensor described in one of the first and second embodiments, shoots an image of an object, and outputs image data. At the time of shooting an image, an image processing unit 506 processes image data shot by the image sensing unit 505, converts the data into a format suited for recording, and outputs the converted data. At the time of playing back a recorded image, the image processing unit 506 processes the image to be played back, and sends the processed image to a display unit 507. The display unit 507 includes a liquid crystal display panel about several inches in size, and displays various display contents in accordance with instructions from a control unit 509. A nonvolatile memory 508 stores information of an address book, and data such as data of e-mail and image data shot by the image sensing unit 505.

The control unit 509 includes a CPU and memory, and controls the respective units of the cellular phone 500 in accordance with a control program stored in the memory (not shown). An operation unit 510 includes a power button, number keys, and various other operation keys used to input data by the user. A card I/F 511 records and reads out various data on and from a memory card 512. An external I/F 513 transmits, to an external device, data stored in the nonvolatile memory 508 and memory card 512, and receives data transmitted from an external device. The external I/F 513 performs communication by a well-known communication method such as wireless communication or a wired communication method conforming to, for example, a USB standard.

Next, the voice communication function in the cellular phone 500 will be explained. When calling a call destination, the user operates the number keys of the operation unit 510 to input the number of the call destination, or operates to display, on the display unit 507, an address book stored in the nonvolatile memory 508, selects the call destination, and instructs origination. When the origination is instructed, the control unit 509 originates a call to the call destination via the communication unit 501. If the call destination answers the call, the communication unit 501 outputs voice data of the destination to the voice processing unit 502, and also transmits voice data of the user to the destination.

When transmitting an e-mail, the user instructs creation of a mail by using the operation unit 510. When the creation of a mail is instructed, the control unit 509 displays a mail creation screen on the display unit 507. The user inputs a transmission destination address and body by using the operation unit 510, and instructs transmission. When transmission of the mail is instructed, the control unit 509 sends address information and data of the mail body to the communication unit 501. The communication unit 501 converts the mail data into a format suited for communication, and sends the converted data to the transmission destination. When the communication unit 501 receives an e-mail, it converts the received mail data into a format suited for display, and displays the converted data on the display unit 507.

Next, the image shooting function in the cellular phone 500 will be explained. When the user operates the operation unit 510 to set the shooting mode and then instructs shooting of a still image or moving image, the image sensing unit 505 performs shooting and sends the shot still image data or moving image data to the image processing unit 506. The image processing unit 506 processes the shot still image data or moving image data, and stores the processed data in the nonvolatile memory 508. The image processing unit 506 sends the obtained still image data or moving image data to the card I/F 511. The card I/F 511 stores the still image data or moving image data in the memory card 512.

The cellular phone 500 can transmit, as a file attached to an e-mail, a file including still image data or moving image data shot in this manner. More specifically, when transmitting an e-mail, an image file stored in the nonvolatile memory 508 or memory card 512 is selected, and transmission of the image file as an attached file is instructed.

The cellular phone 500 can also transmit a file including shot still image data or moving image data to an external device such as a PC or another phone via the external I/F 513. The user selects an image file stored in the nonvolatile memory 508 or memory card 512 and instructs transmission, by operating the operation unit 510. The control unit 509 controls to read out the selected image file from the nonvolatile memory 508 or memory card 512, and controls the external I/F 513 to transmit the readout image file to the external device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2013-253613, filed on Dec. 6, 2013 and 2014-230107, filed Nov. 12, 2014, which are hereby incorporated by reference herein in their entirety.

What is claimed is:

1. An image sensor comprising:
   a plurality of pixels;
   a first reference signal generator configured to output a first reference signal whose signal level changes with time;
   a second reference signal generator configured to output a second reference signal whose signal level changes with time, a rate of change of the signal level of the second reference signal being larger than that of the first reference signal;
   an analog-to-digital converter configured to perform an analog-digital conversion of a pixel signal output from each of the plurality of pixels using the first reference signal or the second reference signal selected in accordance with a magnitude of the pixel signal,
   wherein the plurality of pixels and the first reference signal generator are arranged in a first chip, and the second reference signal generator is arranged in a second chip.

2. The image sensor according to claim 1, wherein the analog-to-digital converter comprises:
   a first comparison unit configured to compare the pixel signal with a predetermined signal;
   a selection unit configured to select as a reference signal to be used in the analog-to-digital conversion the first reference signal in a case where the pixel signal is smaller than the predetermined signal, or the second reference signal in a case where the pixel signal is equal to or larger than the predetermined signal;
   a second comparison unit configured to compare the reference signal selected by the selection unit with the pixel signal;
   a counter unit configured to output a counter value; and
   a first storage unit configured to store the counter value at the time when the selected reference signal exceeds the pixel signal.

3. The image sensor according to claim 2, wherein the selection unit and the second comparison unit are arranged in the first chip, and the first comparison unit, the counter unit, and the first storage unit are arranged in the second chip.

4. The image sensor according to claim 2 further comprising a second storage unit configured to store selection result by the selection unit for one frame,
   wherein, in a case where the selection result is stored in the second storage unit, the first comparison unit does not perform the comparison, and the selection unit selects the reference signal in accordance with the selection result stored in the second storage unit.

5. The image sensor according to claim 4 further comprising a deletion unit configured to delete the selection result stored in the second storage unit from the second storage unit when a predetermined number of frames or a predetermined period of time elapses since the selection result is stored in the second storage unit.

6. The image sensor according to claim 1, wherein the analog-to-digital converter comprises:
   a selection unit configured to select as a reference signal to be used in the analog-to-digital conversion the first reference signal or the second reference signal in accordance with a color represented by the pixel signal;
   a comparison unit configured to compare the reference signal selected by the selection unit with the pixel signal;
   a counter unit configured to output a counter value; and
   a storage unit configured to store the counter value at the time when the selected reference signal exceeds the pixel signal.

7. The image sensor according to claim 6, wherein the color represented by the pixel signal is one of red, green and blue, the selection unit selects the first reference signal in a case where the color represented by the pixel signal is red or blue, and selects the second reference signal in a case where the color represented by the pixel signal is green.

8. The image sensor according to claim 1, wherein the analog-to-digital converter comprises:
   a first comparison unit, provided for each column, configured to compare the pixel signal with a predetermined signal;
   a signal generation unit, provided for each column, configured to output the predetermined signal;

a selection unit configured to select as a reference signal to be used in the analog-to-digital conversion the first reference signal in a case where the pixel signal is smaller than the predetermined signal, or the second reference signal in a case where the pixel signal is equal to or larger than the predetermined signal;

a first storage unit configured to store the selection result by the selection unit;

a counter unit configured to output a counter value;

a second comparison unit configured to compare the reference signal selected by the selection unit with the pixel signal; and a first storage unit configured to store the counter value at the time when the selected reference signal exceeds the pixel signal, wherein the signal generation unit controls a signal level of the predetermined signal in accordance with the selection result stored in the first storage unit.

9. The image sensor according to claim 8, wherein the signal generation unit increases the signal level of the predetermined signal in a case where the selection result stored in the first storage unit indicates the first reference signal, and decreases the signal level of the predetermined signal in a case where the selection result stored in the first storage unit indicates the second reference signal.

10. The image sensor according to claim 1, wherein the signal levels of the first reference signal and the second reference signals change in proportion to time, and a slope of the second reference signal is steeper than a slope of the first reference signal.

11. The image sensor according to claim 1 further comprising a horizontal scanning unit configured to transfer pixel signals that have undergone the analog-to-digital conversion by the analog-to-digital converter, wherein the horizontal scanning unit is arranged on the second chip.

12. The image sensor according to claim 1, wherein the first chip and the second chip are stacked.

13. An image capturing apparatus comprising an image sensor defined in claim 1.

14. A cellular phone comprising an image sensor defined in claim 1.

* * * * *